United States Patent [19]

George

[11] Patent Number: 5,894,813
[45] Date of Patent: Apr. 20, 1999

[54] SQUIRREL-PROOF BIRD FEEDING DEVICE, SYSTEM AND METHOD

[76] Inventor: Robert A. George, 111 Merriam Rd., Broad Albin, N.Y. 12025

[21] Appl. No.: 08/870,813

[22] Filed: Jun. 6, 1997

Related U.S. Application Data

[60] Provisional application No. 60/020,467, Jun. 10, 1996.

[51] Int. Cl.⁶ ............................................. A01K 39/01
[52] U.S. Cl. ............................................. 119/57.9
[58] Field of Search ................... 119/61, 52.2, 52.3, 119/57.8, 57.9, 51.01

[56] References Cited

U.S. PATENT DOCUMENTS

| | | | |
|---|---|---|---|
| D. 103,963 | 4/1937 | Butler | D30/101 |
| 2,261,326 | 11/1941 | Atkisson | 119/61 |
| 2,951,464 | 9/1960 | Milliken | 119/61 |
| 3,399,650 | 9/1968 | Goodman | 119/57.9 |
| 4,434,745 | 3/1984 | Perkins | 119/57.9 |
| 5,479,880 | 1/1996 | Stuhr et al. | 119/57.8 |
| 5,699,752 | 12/1997 | Wilkins | 119/51.03 |
| 5,711,247 | 1/1998 | Henshaw | 119/57.8 |
| 5,740,758 | 4/1998 | Damm | 119/57.8 |

FOREIGN PATENT DOCUMENTS

2236468  4/1991  United Kingdom ............... 119/57.9

*Primary Examiner*—Thomas Price
*Attorney, Agent, or Firm*—Schmeiser, Olsen & Watts

[57] ABSTRACT

A Squirrel-proof birdfeeder is disclosed which prevents a squirrel from consuming feed provided for birds. The feeder is of a flatbed design, and the feed is protected from squirrels by a squirrel barrier with a dual screening mechanism. Also disclosed is a special feeder stand that prevents the squirrel from even perching atop the feeder to begin with, an adjustable roof to prevent access by larger birds, and other variations that further enhance the utility of this birdfeeder.

19 Claims, 9 Drawing Sheets

SQUIRREL-PROOF BIRD FEEDING DEVICE, SYSTEM AND METHOD

This application claims the benefit of U.S. Provisional Application No. 60/020,467.

BACKGROUND OF THE INVENTION

Birdwatching is a pastime of increasing popularity in the United States and abroad. While an excursion into a wilderness area is one way to view birds, many people derive satisfaction by attracting birds to their own yards through various seed feeding devices. However, the seed provided by these devices is also highly-attractive to squirrels and other rodents. A perennial problem plaguing all such devices, therefore, is how to provide feed to attract birds, while simultaneously preventing squirrels and other animals from also partaking of that feed and scaring away the birds for which the feed is intended.

Traditional upright feeders, often in a cylindrical or similar configuration, with a vertical axis of symmetry for the circular surface cross sections of the feeder, and with the seed provided through a wire-like mesh on the cylindrical surface, have the added disadvantage that one cannot view all of the birds which are feeding at the feeder. One can only view those birds on the same side of the cylinder as the viewer, which amounts to only about half of all the feeding birds. In addition, the squirrel-deterring capabilities of these feeders are minimal at best.

Traditional flatbed feeders are preferable from the standpoint of being able to view all of the birds presently at the feeder and ease of use in loading feed into the feeder. But the ability of such feeders to prevent squirrels from feeding on the same feed is minimal or non-existent, and they provide a ready platform upon which a squirrel can perch in order to feed.

Many efforts to prevent squirrels from partaking of bird feed have involved suspending a feeder from a tree. While this may prevent a squirrel from jumping onto the feeder directly off of the ground, it does not prevent the far-more common approach wherein the squirrel will simply climb up the tree and jump down onto the feeder. It also requires the viewer to hang the feeder fairly high in the tree, and therefore, does not allow for eye-level viewing, which is much more preferable. It also does not allow the feeder to be placed in a location where a tree is not available, e.g., on a patio or balcony, and so greatly limits the flexibility of a feeder in terms of viable locations for placement. It would be desirable to be able to place a feeder in any setting whatsoever, while making the feeder inaccessible to squirrels.

Further, it may also be desired to limit the types of birds that feed at a feeder. In part, this can be achieved by choice of seeds. However, it would also be desirable to control access to the feeder such that larger birds, such as grackle, cowbird, and turtle dove, are unable to gain access to the feeder, while smaller birds, such as goldfinch, nuthatch, and chickadee, etc., can continue to gain such access.

Further, certain birds, such as woodpeckers, prefer suet (animal fat) for feed, and require a different feeder configuration to enable them to access this suet. It would be desirable for a feeder to have a way of providing feed for these birds as well, while continuing to prevent access by squirrels.

Finally, in the event one does not mind observing squirrels as well as birds, but does not want the squirrels partaking of the feed intended for birds, it would be helpful to provide a separate feeding area for squirrels that will maintain them separately from the birds and lessen their desire to encroach upon the bird feeding area.

SUMMARY OF THE INVENTION

The invention disclosed and described herein is a squirrel-proof bird feeder that prevents squirrels from accessing the feed intended for birds, and further makes it difficult for them to come into the area where the feed is located.

The feeder utilizes a physical screening mechanism that takes advantage of differences in the facial characteristics between birds and squirrels, such that on the one hand it enables birds to readily gain access to the feed, and on the other hand, it prevents squirrels from gaining similar access.

The basic feeder is essentially of a traditional flatbed design, in which the feed is distributed directly upon a flat, horizontal feeding surface (feed bed) enclosed by a feeding surface boundary. Added atop and providing an access barrier to the feed bed of this basic feeder, however, is a novel, non-obvious, removable squirrel barrier with dual screening mechanism, comprising an upper and a lower screen with surfaces parallel to one another, connected in fixed relationship to one-another by a squirrel barrier frame.

These parallel screens are connected to the squirrel barrier frame and separated from one another at a distance fixed by the vertical dimension of the squirrel barrier frame. The upper screen comprises chicken wire or a similar wire screening mechanism. The lower screen comprises a second screening wire or similar mechanism.

When placed upon the feed bed, the squirrel barrier frame fits snugly inside the feeding surface boundary, and the lower screen fits directly upon the feed placed atop the feed bed and prevents lateral movement of the feed.

The aperture dimension of the upper screen is chosen to be wide enough such that a bird can bob its head down through the aperture and descend its beak the full distance between the upper screen and the feed, and thereby partake of the feed. It is simultaneously chosen to be narrow enough such that a squirrel will not be able to push its face down toward the feed, and further extend its tongue down toward the feed, in close enough proximity to the feed to enable it to partake of said feed.

However, even if a squirrel cannot directly snatch the feed off of the feedbed with its tongue, it would be possible for the squirrel to push the feed along the horizontal feedbed surface using its tongue, accumulate enough feed upon one section of the bed (usually against the outer boundary of the feedbed) such that the feed in that section is raised to a higher level than the feed elsewhere in the bed. Once this level has been raised, the feed in that section is then close enough to the squirrel such that the squirrel can partake of the feed at this higher level. This is a problem common to existing, screened flatbed feeders.

To avert this common problem, the lower screen (which can take on a range of variations) complements the above-described function of the upper screen in a very important and crucial way. Because the lower screen rests directly atop the feed, has a fairly narrow aperture, and has a fairly wide wire dimension, the lower screen pushes down on the feed, making the feed horizontally immobile, and thereby rendering it impossible for a squirrel to move or gain access to the feed by using its tongue to pile the feed in a particular section of the feed bed, as described more fully in the detailed description of the preferred embodiment of the invention.

There are several other features of this invention also described and disclosed herein which complement the above-described squirrel barrier. These which make it even more difficult for a squirrel to gain access to the feed, and enhance the overall utility of this invention.

A special modification can be made to a section of the squirrel barrier screens that allows the addition of suet, an animal fat particularly attractive to woodpeckers, in such a way that this feed remains segregated from the other feed, inaccessible to squirrels, and readily accessible to woodpeckers.

While the squirrel barrier summarized above can stop a squirrel that is already atop the feeder from accessing the feed, it does not in any way deter the squirrel from getting atop the feeder in the first instance. As noted in the background discussion earlier, hanging a feeder from a tree is not effective to this end and also limits the placement of a feeder.

Thus, a special feeder stand variation is also disclosed that makes it very difficult for a squirrel to even climb atop the feeder in the first instance, much less eat the feed once it is atop the feeder. This stand also simulates the swaying of a tree branch in response to wind or movement, and thereby creates an environment for the bird similar to what they experience when perched atop a tree branch.

This feeder stand utilizes a feeder sub-platform placed beneath the feeder. The horizontal dimensions of this feeder sub-platform are substantially smaller than the corresponding horizontal dimensions of the basic flatbed feeder itself. The basic feeder flatbed is supported by a series of wire arms which connect to the edges of this feeder sub-platform, which then extend upward and radially outward toward the edges of the larger-dimensioned feeder platform, which then connect to and support the feeder platform at its outer edges. These wire arms are of sufficient length to maintain the flatbed high enough above the sub-platform, so that a squirrel on the sub-platform attempting to jump atop the flatbed feeder would have to jump upward and radially outward to do so, and the radially-outward momentum of the squirrel would make it difficult if not impossible for the squirrel to achieve this. Of course, even with this feeder stand, the feeder must not be placed below a tree or other object upon which a squirrel can independently perch, and from which the squirrel can then jump onto the feeder.

The sub-platform in turn is supported by a series of wire legs that are unitary with the wire arms and extend through the sub-platform, maintaining the subplatform well above the ground. Thus, a squirrel that has made its way onto the subplatform must make its upward jump toward the flatbed feeder from the subplatform, and is thus forced to generate the radially-outward momentum that dooms its jump to failure. Because the subplatform is so-elevated, the squirrel has no other perch from which to launch its approach to the top of the flatbed. If it chooses to jump directly from the ground, it must manage an impossible upward jump.

A variation of this invention also involves placing squirrel feed (e.g., corn, or something of similar attractiveness) upon the sub-platform. A squirrel can thus feed at the subplatform while birds feed at the main flatbed, and, being satisfied by the feed provided on the sub-platform, has less incentive to even attempt a jump onto the main flatbed.

Another variation of this invention involves placing a roof of adjustable height above the flatbed feeder. When the roof is removed or set to its maximum height, any and all bird types can easily gain access to the feeder and partake of the feed. When the roof is set to a lower position, however, larger birds, such as grackle, cowbird, and turtle dove, do not have enough room to perch atop the flatbed. This provides some degree of control, on the basis of size, over the types of birds that feed at the feeder.

Another stand variation comprises a swiveling, locking leg set that can be used to mount the flatbed feeder directly on a rail (e.g., the rail of a deck).

Another feeder variation involves a slide mechanism that makes it even more difficult for squirrels to gain a foothold at the feeder and which, in combination with the roof, will make it more difficult for larger birds to feed at the feeder.

Finally, a variation involves setting up various perches along the perimeter of the flatbed feeder to ease access for whatever bird are desired.

DETAILED DESCRIPTION OF THE PREFERRED EMBODIMENT OF THE INVENTION

Figure 1A:
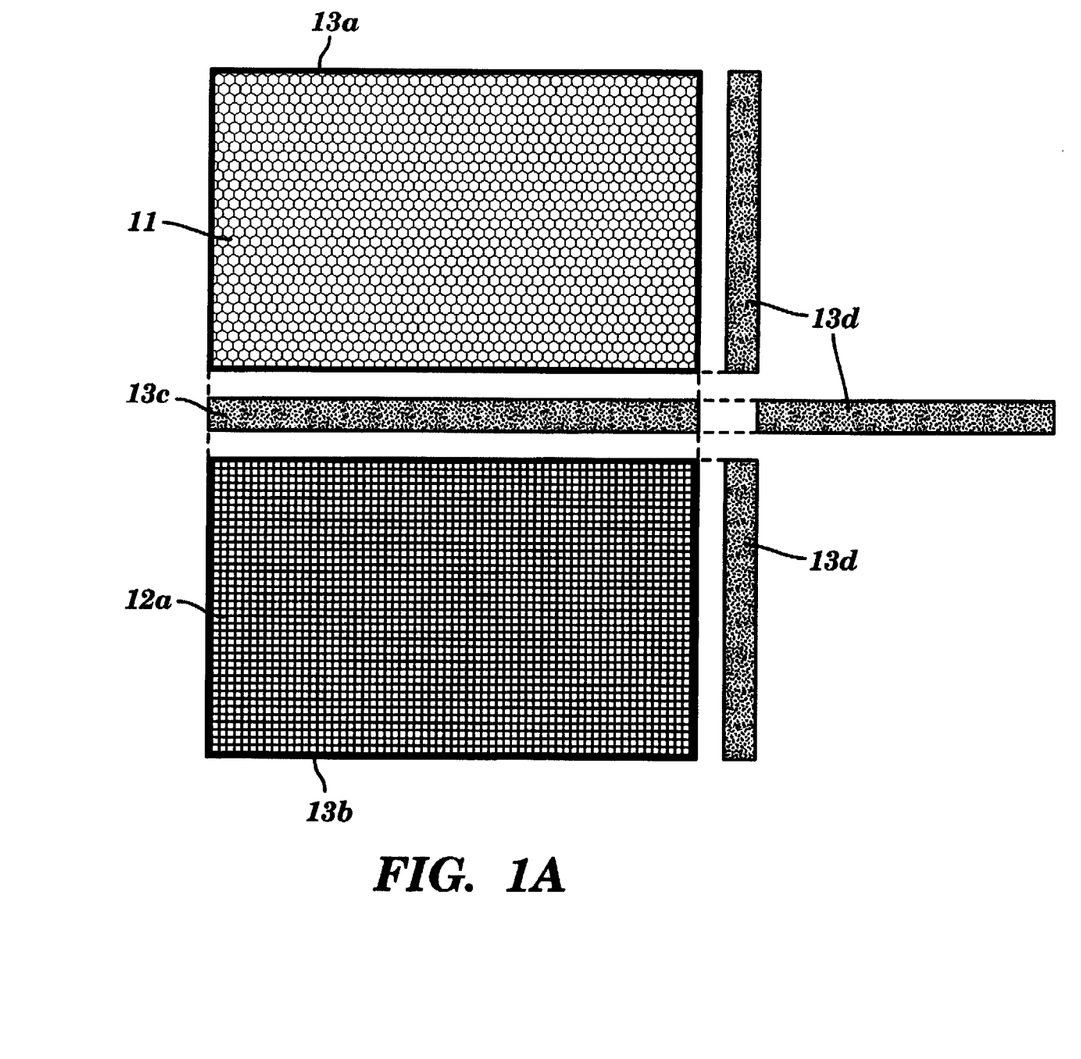
FIG. 1a depicts the removable squirrel barrier with dual screening mechanism, and the manner of attachment of the lower screen.

FIG. 1a depicts the removable squirrel barrier with dual screening mechanism, in various two-dimensional views. This critical device and method prevents a squirrel perched atop a flatbed squirrel feeder from gaining access to the bird feed resting upon the feed bed of the flatbed feeder.

The squirrel barrier comprises an upper screen 11 and a lower screen 12a connected with surfaces parallel to one another, at a fixed distance from one another, by a (rectangular) squirrel barrier frame, depicted from various viewpoints by 13a, 13b, 13c, and 13d. The top view is 13a, the bottom view is 13b, the front view is 13c, and several right-side views are 13d. For convenience, and in this and some later figures, this squirrel barrier frame as a whole will sometimes be referred to and depicted simply as 13.

These parallel screens 11 and 12a are connected to the squirrel barrier frame 13 and separated from one another by anywhere from 0.75 to 1.5 inches, which is essentially the vertical dimension of the squirrel barrier frame, i.e., the vertical widths of the front view 13c and right-side views 13d. The upper screen 11 comprises, for example, chicken wire, or an alternative screening mechanism of similar characteristics, attached to the frame 13 at or near the top of the frame, along the upper perimeter of the squirrel barrier, as shown in 13a. The diameter of the apertures in this upper screen can be anywhere from 0.75 to 1.5 inches, with wire thickness running in the neighborhood of a standard 20 gauge chicken wire. The lower screen 12a comprises a wire screening mechanism with apertures ranging from 0.25 to 0.75 inches, and a wire thickness in the neighborhood of an 18 gauge screening. It is attached to the frame 13 at or near the bottom of the frame, along the lower perimeter of the squirrel barrier, as shown in 13b. The wire comprising 12a can be of any suitable material, e.g., metal, plastic, nylon, fishing wire, etc., and is not limited by this disclosure and any particular material or materials.

Toward the lower-right of FIG. 1a is depicted a crosssectional view of how the lower screen 12a may be attached to the squirrel barrier frame 13 at attachment joints 14. (The darkened rectangles denote a cross-sectional view of components of the frame 13 that run into the page and are attached in a perpendicular manner to the undarkened area of 13.) Also shown for reference is the upper screen 11. It is to be noted that the surface of the lower screen 12a is slightly below the lower plane of the frame 13. As will be discussed in connection with FIG. 2, this enables the entire squirrel barrier to descend as seed is consumed by birds, thus keeping the seed tightly packed in a manner that prevents feeding by squirrels. It is to be noted that the manner of attachment depicted applies to all sides of the squirrel barrier frame 13, i.e., that from the subfigure in the lower right of FIG. 1a can represent both a front view and a side view of the squirrel barrier in terms of the manner of attachment of the lower screen 12a to the squirrel barrier frame 13. Also, it is noted that this attachment can be achieved in any of a variety of ways, so long as the squirrel barrier frame 13 is kept higher than the lower screen 12a, so that the frame 13 will not rest directly upon the feed and prevent downward movement of the squirrel barrier, as will be discussed more fully once FIG. 2 has been described.

Figure 1B:
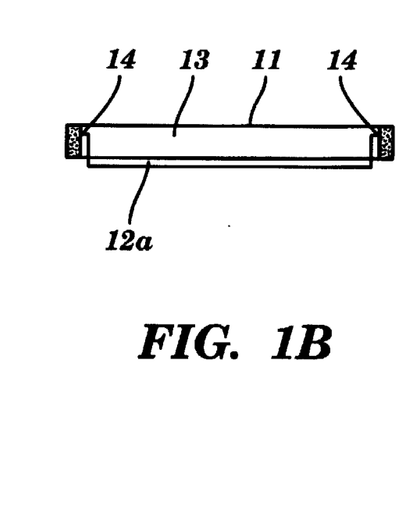
FIG. 1B is a cross sectional view of the squirrel barrier of FIG. 1A.
Figure 1C:
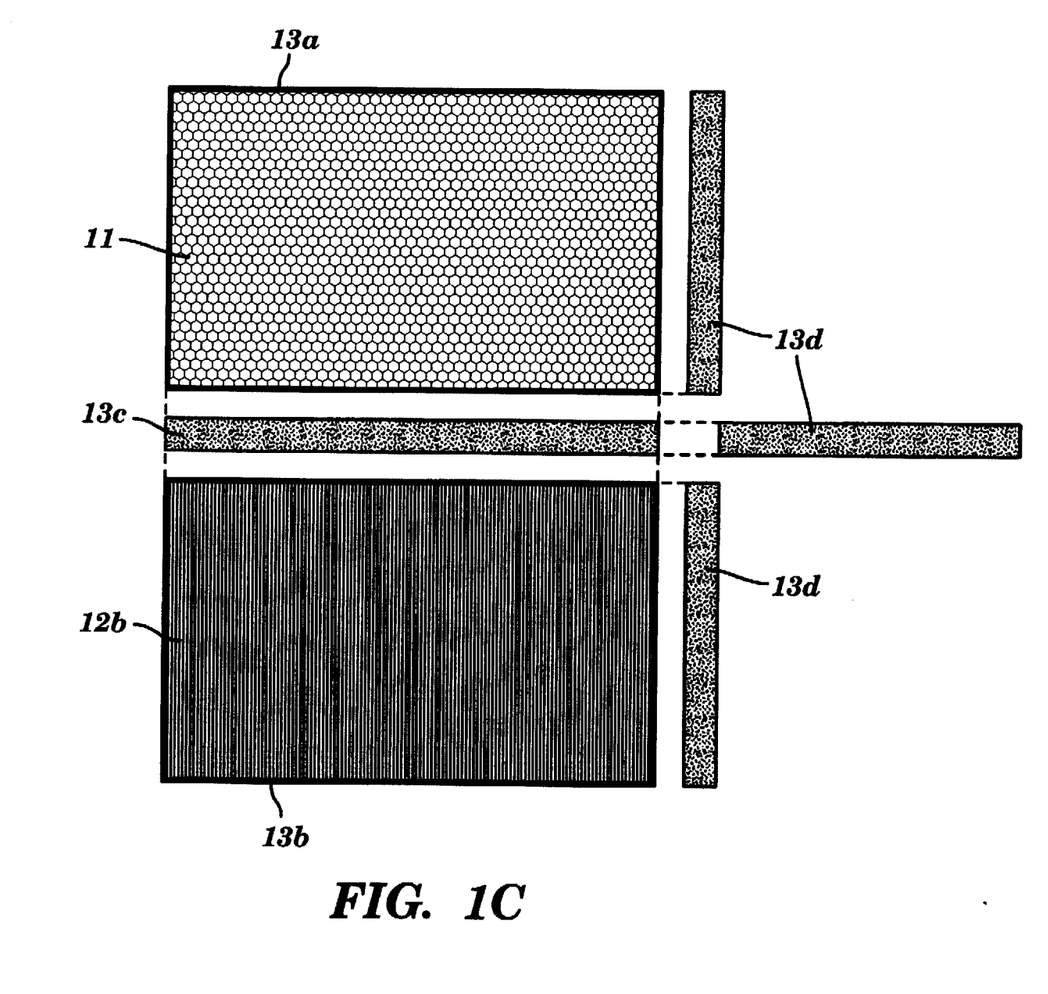
FIG. 1C depicts the removable squirrel barrier with an alternative dual screening mechanism, particularly, with an alternative configuration for the lower screen.
Figure 1D:
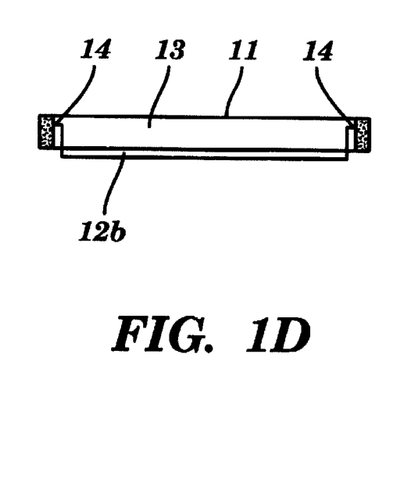
FIG. 1D is a cross view of the squirrel of FIG. 1C.

FIG. 1b similarly depicts the removable squirrel barrier, but with an alternative configuration for the lower screen, 12b. This alternative variation of the lower screen 12b comprises a parallel series of elongated strips depicted with hashmarks running from lower-left to upper-right, each of a width ranging from 1/16 inch to 1/2 inch. Each strip comprising the lower screen 12b is separated from the adjacent strip by a small slot, each slot providing an aperture ranging from 1/16 to 1/2 inch into which a bird will reach to obtain its seed. These strips can be fabricated from plastic, nylon, or any other material with similar tensile and elastic properties. Similarly to 12a, the alternative lower screen 12b is also attached at or below the lower plane of the squirrel barrier frame 13, as shown at the lower-right of FIG. 1b. In later figures, the squirrel barrier as a whole will be labelled and referred to as 1.

Figure 2:
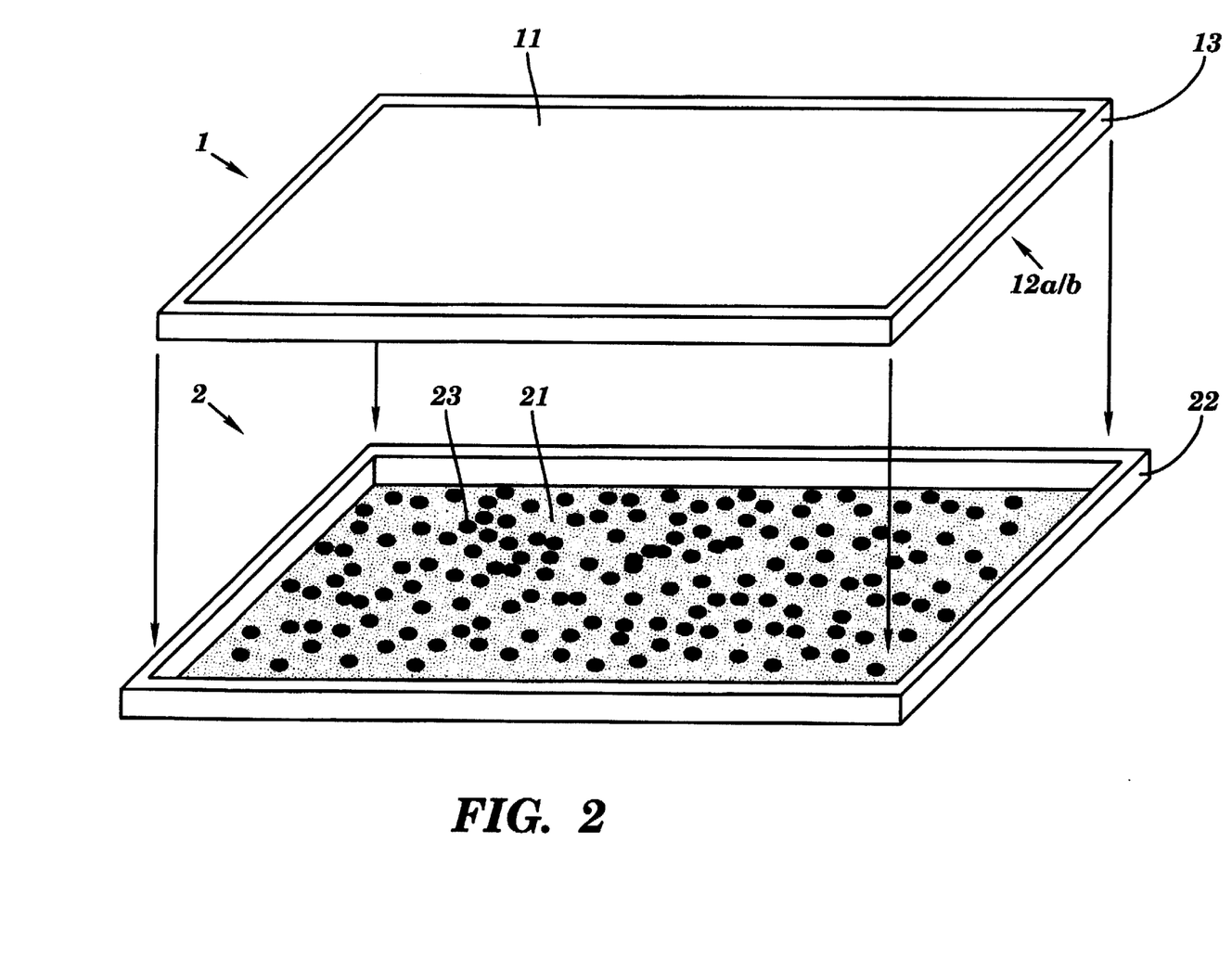
FIG. 2 depicts the flatbed feeder itself, as well as the placement of the removable squirrel barrier into said feeder to prevent squirrels from accessing feed residing within the flatbed feeder.

FIG. 2 depicts in a three-dimensional view a flatbed feeder, as well as the placement of the removable squirrel barrier described in FIGS. 1a and 1b, into said feeder to prevent squirrels from accessing feed residing within the flatbed feeder.

The flatbed feeder 2 comprises a horizontal feeding surface (feed bed) 21 enclosed by a feeding surface boundary 22. This feeding surface boundary 22 runs around the outer perimeter of the feed bed 21, and is affixed to said perimeter so as to rest above and enclose the feed bed. The bird feed, 23, is distributed evenly upon the feed bed 21. The feed bed 21 can comprise any flat level surface. It is, however, preferable to construct the feedbed 21 out of a course screen (not explicitly depicted here) with apertures running from 1/8 to 3/8 inches, similar in appearance to the screen 12a shown in FIG. 1a. One may then rest a separate, removable, fine screen (also not explicitly depicted here) with aperture from 1/32 to 1/8 inch (similar to standard-sized home window screening) directly upon the course screen, and then place the feed 23 directly upon said fine screen. Among other advantages, this allows rainwater to fall through the feed bed 21 rather than accumulate, while the roughness of the screen further inhibits lateral movement of the seed by a squirrel, along the feedbed.

The removable squirrel barrier depicted in FIGS. 1a and 1b, is now shown in FIG. 2 as a single three-dimensional entity, labelled 1. Depicted in this view is the upper screen 11 (with densely-packed gray shading lines running from upper left to lower right, proxying, for drawing purposes only, for the chicken wire-like mesh disclosed earlier) and the squirrel barrier frame 13, as well as the lower screen 12 (denoted 12a/b to refer to the alternative configurations 12a or 12b depicted in FIGS. 1a and 1b respectively), which resides on the bottom of the squirrel barrier boundary and so is not directly visible from this viewpoint. (If one were viewing the feeder itself from this view, one would be able to gain an upper view of the lower screen 12a/b through the wire mesh of the upper screen 11.)

The horizontal dimensions of the squirrel barrier 1 and the flatbed feeder 2 are designed relative to one another such that the outermost perimeter of the squirrel barrier frame 13 is slightly smaller than the inner perimeter of the feeding surface boundary 22. Thus, when placed upon the feed 23 in the feed bed 21, the squirrel barrier frame 13 fits snugly inside the feeding surface boundary 22, and the lower screen 12a/b fits directly upon the feed 23 placed atop the feed bed 21. Thus, since the upper screen 11 is fixed at 0.75 to 1.5 inches above the lower screen 12a, its distance from the feed will similarly be approximately 0.75 to 1.5 inches.

The method of using the squirrel barrier 1 in combination with the flatbed feeder 2, therefore, is to first distribute bird feed 23 upon the feed bed 21, and then to place the squirrel barrier 1 snugly into the flatbed feeder 2, resting atop the bird feed 23, with the upper screen 11 oriented upwards and the lower screen 12a/b making direct contact with and resting directly atop the seed 23. This method of placement is depicted by the downward-pointing arrows in FIG. 2.

Considering FIGS. 1a and 1b together with FIG. 2, it becomes possible to describe why the invention disclosed herein prevents squirrels from gaining access to the bird feed 23 resting upon the feedbed 21, as follows.

The aperture dimension of the upper screen 11, 0.75 to 1.5 inches, is chosen to be wide enough such that a bird can bob its head down through the aperture and descend its beak the full 0.75 to 1.5 inches between the upper screen and the feed, and thereby partake of the feed. The relatively rounded shape of a chicken wire aperture provides a natural opening into which the bird may descend its head without intimidation, while a smaller aperture or less-rounded shape may deter a bird from placing its head into the aperture. This aperture is simultaneously chosen to be narrow enough such that a squirrel will not be able to push its face down toward the feed, and further extend its tongue down toward the feed, in close enough proximity to the feed to enable it to partake of said feed. In short, the bird can easily put is head through the upper screen 11, but a squirrel cannot.

However, even if a squirrel cannot put its head through the upper screen 11 to directly snatch the feed off of the feedbed with its tongue, it would be possible, absent the lower screen 12a/b, for the squirrel to push the feed 23 along the horizontal feed bed surface 21 using its tongue, and accumulate enough feed upon one section of the feed bed (usually against the outer boundary of the feedbed) such that the feed in that section is raised to a higher level than the feed elsewhere in the feed bed. Once this level has been raised, the feed in that section is then close enough to the squirrel such that the squirrel can partake of the feed at this higher level. This is a problem common to existing, screened flatbed feeders.

To avert this common problem, the lower screen 12a/b complements the above-described function of the upper screen in a very important and crucial way. As regards 12a, Because the lower screen 12a rests directly atop the feed 23 as shown in FIG. 2, has a fairly narrow aperture of 0.25 to 0.75 inches, and has a fairly wide wire dimension on the order of 18 gauge, the lower screen 12a pushes down on the feed 23, making the feed horizontally immobile, preventing horizontal movement of the feed along the horizontal surface of the feed bed 21, and thereby rendering it impossible for a squirrel to move or gain access to the feed by using its tongue to pile the feed in a particular section of the feed bed. The squirrel, when it is perched atop the squirrel barrier 1, only makes matters worse for itself, by adding extra weight to the squirrel barrier, and thereby immobilizing the feed with that much more applied weight. In addition, when a squirrel places downward pressure on squirrel barrier 1, the lower screen 12a tends to push the feed 23 upon the feed bed 21 toward a fairly even distribution, without clustering in any one section of the feedbed such that the squirrel can access a cluster of feed piled, higher than the norm.

On the other hand, this immobilization of the feed in the feedbed does not in any way adversely affect feeding by the bird. Whereas a squirrel must press its bluntly-shaped face against the upper wire and use its blunt tongue in its attempt to gain access to the feed below, a bird need merely stick its head through the wires of the upper screen 11 and its beak through the lower screen 12a, and can easily snatch the feed 23 directly off of the feedbed 21 for feeding. The distance of 0.75 to 1.5 inches between the parallel upper and lower screens 11 and 12a, combined with the apertures and wire thicknesses of the two screens, is small enough to enable a bird, with its small, rounded head and elongated beak, to readily reach and consume the feed. But it is also large enough to make it impossible for the squirrel to reach the feed with its tongue, get enough of a hold on the feed with its teeth or tongue in order to consume the feed directly from its location on the feedbed, or move the feed into a pile that will bring the feed close enough to the squirrel to allow for its consumption by the squirrel.

Also, while not strictly necessary, if the lower screen 12a descends slightly below the bottom plan of the squirrel barrier frame 13 as shown toward the lower-right of FIG. 1a, then the only thing directly upon the seed is the lower screen 12a itself, and not any part of the frame 13. Thus, as the birds consume the feed and thereby reduce the amount of feed in the feeder, the remaining feed will tend to distribute evenly upon the feedbed, since it will not get stuck under the frame 13 and prevent downward movement of the entire squirrel barrier. This will enable the squirrel barrier as a whole to gradually descend as the feed is consumed, maintaining a fairly level and even distribution of feed atop the entire feedbed surface. If the lower screen 12a/b is not mounted in this way, a similar end can be achieved by ensuring that the horizontal width of squirrel barrier frame 13 (e.g., the width of 13 as depicted by the 13a and 13b views of FIGS. 1a and 1b) is chosen to be of sufficiently narrow dimension so that seeds are not likely to accumulate beneath it, but will rather be forced to one side or the other to allow downward movement of the squirrel barrier as a whole.

The particular variation for the lower screen 12b, which was introduced in FIG. 1b, has all of the benefits described above with respect to alternative 12a. These elongated strips comprising 12b should be sufficiently taut to permit slight, but not very much movement. Geometrically, these strips provide a set of very narrow, liner slot apertures into which a bird or squirrel must reach to obtain the seed below. Because the strips are somewhat wider than the wire used for 12a, they will press firmly down upon the seed and make it even more difficult for a squirrel to move the seed along the feedbed with its tongue. However, a bird, with its beak, can readily nudge the a strip far enough out of the way to extract the seed below. In addition, a problem also encountered in many birdfeeders is the cleaning out of shells. That is, birds will eat the inner part of many seed types, leaving a useless shell or husk remaining in the feeder, and it is necessary for the feeder owner to clean this residue out from the feeder and separate it from the good feed—a painstaking task. With the configuration 12b, shells and husks that are dropped back onto the feeder will remain atop the elongated strips and will not descend back to beneath these strips. Thus, cleaning shells and husks becomes a simple matter of removing the squirrel barrier, dumping out the residue, and replacing the barrier. The good (uneaten) seed remains atop the feedbed but below the lower screen 12b, and so will not be dumped during this process.

Finally, this overall design of a flatbed feeder upon which seed is laid, and then secured by the squirrel barrier, allows the owner of the feeder to lay out a wide variety of bird seeds on different areas of the flatbed, providing a "smorgasbord" of seeds attractive to a wide range of various birds.

While this disclosure shows a rectangular squirrel feeder, it is obvious that a feeder of similar squirrel-excluding capabilities can be designed to be of any shape and size, so long as it includes the dual screening mechanism described above and comprises a squirrel barrier resting snugly within the feeding surface boundary of the flatbed feeder. Similarly, one can make many obvious substitutions of the screening wire, and can use any material for the wire, so long as the basic wire apertures and thicknesses, and the distance between the parallel screens, are such that they effectively prevent a squirrel from partaking of the feed as described above while enabling birds to gain access. The method of manufacture is irrelevant, so long as the basic functional characteristics disclosed herein are addressed. Similarly, one can easily integrate the basic flatbed feeder with squirrel barrier as disclosed herein, into any birdhouse/birdfeeder design within which the feed itself is to be consumed off of a flat surface similar to the feedbed discussed herein. So, any variations incorporating this disclosure, which are simply of a birdhouse design nature, are also contemplated by this disclosure.

Figure 3:
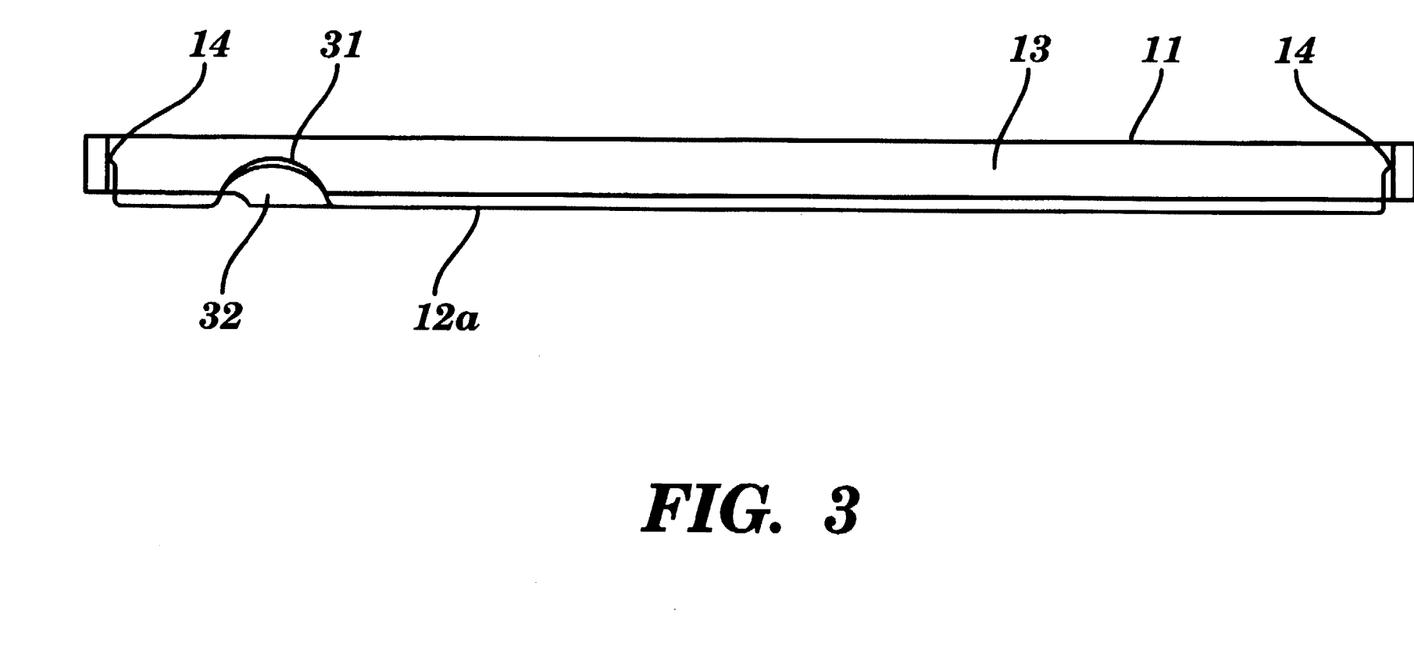
FIG. 3 depicts an optional modification to the squirrel barrier that allows for the placement of suet feed, which is attractive to woodpeckers.

FIG. 3 depict a special modification which can be made to a section of the squirrel barrier screens to allows the addition of suet—essentially large hunks of animal fat—to the feeder. This is a feed that is particularly attractive to woodpeckers.

FIG. 3 in particular, depicts a cross-sectional view of the squirrel barrier similar to that shown in FIG. 1a. Newly-added, however, is a suet feed section 31 comprising a semicircular upward bend in the lower screen 12a, wherein the suet 32 is stuffed into the suet feed section 31 beneath the upward bend in 12a, as depicted. It is to be noted that the suet feed section utilizes a bend in the lower screen alternative 12a, and that to implement a suet feeder for the alternative 12b, that one would need nevertheless to have a section of the 12a-type screening in which to introduce the upward bend. That is, to use a 12b-type screen with a suet feeder, one would create a 12a/12bhybrid wherein 12b-type slotted screening comprises the primary lower screen, but where a section of 12a type screening is also introduced with the upward bend that comprises the suet feeder 31.

The operational characteristics of the suet feeder 31 are quite straightforward. Suet, essentially chunks of animal fat, can not fit below a flat lower screen 12a or 12b in the same manner as regular birdseed. Thus, the upward bend depicted by 31 is provided into which one can essentially stuff chunks of animal fat. This places the fat in closer proximity to the upper screen than the seed resting on the flatbed, so it might be thought that a squirrel could reach and partake of the suet. However, to eat any of the suet, the squirrel would have to take a bite out of the fat directly with his teeth or grab a chunk of suet and pull it out through the lower screen 12a. Because of the narrow aperture of the lower screen 12a, and because the suet chunks are much larger than this narrow aperture of the lower screen 12a and the suet feeder 31, this is impossible. A woodpecker, on the other hand, is ideally suited to reach its beak through the narrow aperture and nibble off small pieces of the suet.

While the squirrel barrier 1 placed atop the flatbed feeder 2 as disclosed above in connection with FIGS. 1 and 2 can stop a squirrel that is already atop the feeder from accessing the feed, it does not in any way deter the squirrel from getting atop the feeder in the first instance. As noted in the summary of the invention, hanging a feeder from a tree is not effective to this end and also limits the placement of a feeder.

Figure 4:
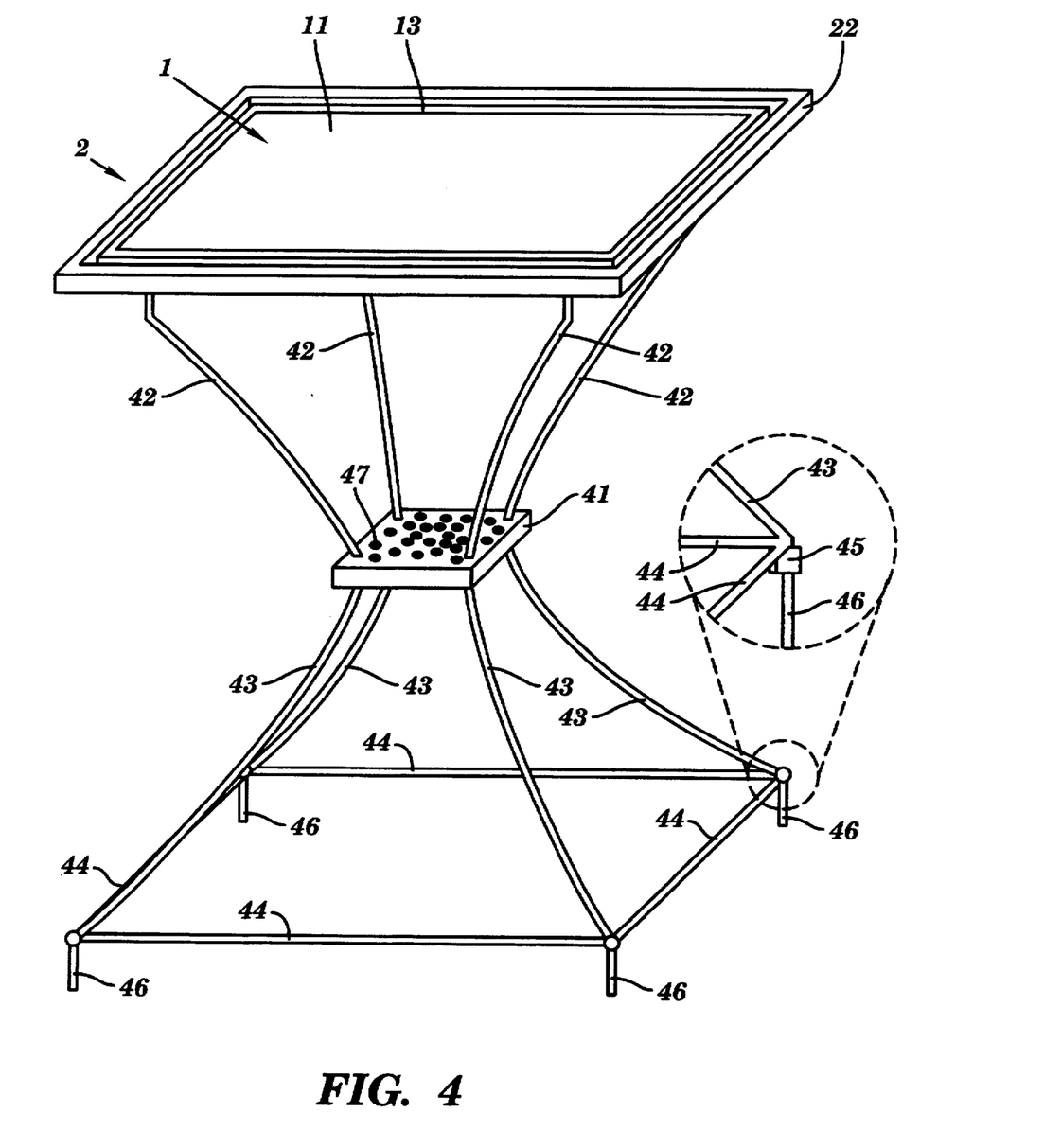
FIG. 4 depicts an optional special feeder stand with sub-platform which makes it difficult for a squirrel to climb atop the feeder and enables a high degree of flexibility in feeder placement.

To address this, FIG. 4 depicts a special feeder stand with sub-platform which makes it very difficult for a squirrel to even climb atop the feeder in the first instance, much less eat the feed once it is atop the feeder.

This feeder stand includes a feeder sub-platform 41 which is placed perhaps birdfeeder 1½ to 3 feet beneath the flatbed feeder 2. The horizontal dimensions of the feeder sub-platform 41 are substantially smaller than the corresponding horizontal dimensions of the flatbed feeder 2 itself. The flatbed feeder 2 is supported by a series of flatbed support arms 42 which connect near the periphery of the feeder sub-platform 41, which then extend upward and radially outward toward the periphery of the larger-dimensioned flatbed feeder 2, which then connect to and support said feeder platform 2 by attachment to the bottom periphery of said feeder platform 2. These flatbed support arms 42 are of sufficient length to maintain the flatbed 2 at perhaps 1½ to 3 feet above the sub-platform 41, and may be fabricated from metal or any other substance with sufficient rigidity to support the flatbed, and sufficient flexibility to allow some bending of the arms in response to the weight that resides upon them and in response to wind currents. FIG. 4 depicts this by showing a slight bend in the arms 42, which would ordinarily be straight absent the weight placed upon them and their bending by virtue of the assembly of the feeder stand, as discussed further below. There is also depicted an elbow near the upper part of some of the arms 42, which allows a vertical connection to the bottom of the flatbed 2.

A squirrel on the sub-platform 41 attempting to jump atop the flatbed feeder 2 and the squirrel barrier 1 would have to jump upward and radially outward to do so, and the radiallyoutward momentum of the squirrel would make it difficult if not impossible for the squirrel to achieve this. Of course, even with this feeder stand, the feeder must not be placed below a tree or other object upon which a squirrel can independently perch, and from which the squirrel can then jump onto the feeder.

The sub-platform 41 in turn is supported above the ground by a second series of sub-platform support legs 43 that maintain it at perhaps an additional 1½ to 3 feet above the ground, which may be fabricated out of material similar to that use for the arms 42, and which attach to the underside periphery of the sub-platform 41. Indeed, as discussed below, it is preferred if the arms 42 and the legs 43 comprise a unitary length of straight, semi-rigid rod.

The connection of the arms 42 to the top of the sub-platform 41 and to the underside of the flatbed 2, and of the legs 43 to the underside of the subplatform, can be achieved in many different ways that would be obvious to someone of ordinary skill in the mechanical arts and would require minimal undue experimentation. The preferred embodiment, though far from the only option, is for each arm 42 and leg 43 to be manufactured as a single, unitary item that, when disassembled, is essentially one long, straight (aside from the elbows and footings to be discussed below), semi-rigid rod. In assembling the feeder stand, one would first slide the combined arm/leg units 42/43 into holes at the corners of the subplatform 41, insert the very tops of the rods (above the elbows) into holes at the corners of the flatbed 2, and then pull the legs 43 to bend them outward, with the main bending occurring at the subplatform 41, as shown in the FIG. 4.

To secure this arrangement, one finally uses a series of restraining rods 44. Each of these rods is essentially a straight, rigid rod along its primary length, with a perpendicular bend of short length at each end of the rod, and with the two bends at the two ends of a given rod running parallel to one another. Each leg 43 is then given a further bend at a second elbow depicted near the bottom of the leg, terminating in a footing 46 that aligns perpendicularly to the ground placement. At the top of each footing 46, just below the elbow between the leg 43 and the footing 46, is a pair of loop joints 45. The aforementioned bent ends of the restraining rods 44 are then inserted into the loop joints 45 of adjacent footings 46, providing stability to the overall configuration. The exploded, encircled area depicted in FIG. 4 illustrates the attachments that take place at the loop joints 45, wherein each of the two restraining arms 44 converge at and are inserted into a loop joint, and wherein the loop joint pair 45 is affixed permanently to the footing 46 just below the second elbow point at which the leg 43 bends into the footing 46.

The overall feeder stand configuration, using unitary arms/legs, has a strong, stabilizing tension introduced by virtue of attaching the tops of the arms 42 to the underside of the flatbed 2, passing the arms/legs through holes in the subplatform 41, pulling the legs 43 outward into a bent position, and then restraining the legs in this bent position via the attachment of the restraining rods 44 into the loop joints 45. This tension allows the feeder stand as a whole to respond to wind and other physical forces with a gentle, swaying motion not unlike that of a tree branch, which makes the device even more conducive to attracting birds, and it provides a stable, solid configuration for the assembled feeder with stand.

Of course, this preferred embodiment is simply one of many conceivable examples of how to define the various modular components of the feeder stand depicted in FIG. 4, and of how to assemble and disassemble these components into and from the overall feeder and feeder stand unit. Obviously, someone of ordinary skill in the mechanical arts can, without undue experimentation, design a wide variety of schemes for assembling and disassembling the basic stand depicted in FIG. 4, and it contemplated that all such variations are within the ambit of this disclosure.

Also depicted in FIG. 4 is squirrel food 47, which can be seed, corn, nuts, or anything else of interest to a squirrel which can be placed on the sub-platform 41 to keep a squirrel occupied and reduce the incentive for the squirrel to attempt an encroachment into the bird feeding area, if desired.

The configuration outlined in FIG. 4 places the flatbed 2 and squirrel barrier 1 at anywhere from perhaps three to six feet above the ground. Thus, a squirrel that has made its way onto the subplatform must make its upward jump toward the flatbed feeder 2 from the subplatform 41, and is forced to generate the radially-outward momentum that dooms its jump to failure. Because the subplatform is in turn elevated above the ground by several feet, the squirrel has no other perch from which to launch its approach to the top of the flatbed. If it chooses to jump directly from the ground, it must manage an impossible upward jump of as much as six feet. By fabricating the arms 42 from a low-friction material, it can be made difficult for a squirrel to simply climb up the arms 42.

Of course, the entire feeder stand can be varied in many obvious shapes and sizes, and can be constructed with a wide variety ways using a wide variety of material substitutions that are similarly obvious. And again, while the ability to disassemble and reassemble the stand and the entire squirrel-proof bird feeder adds to convenience and utility, there are many ways that one can disassemble and reassemble the component parts with one another that would be obvious to a person of ordinary skill in the mechanical arts, and which are all contemplated as being within the scope of this disclosure and related claims, so long as the sub-platform is constructed and oriented within the overall feeding system in such a manner as to force the squirrel into a jump with radially outward momentum such that it is virtually impossible for the squirrel to reach the top of the squirrel barrier, and such that the height of the flatbed makes impossible a direct jump from the ground. The tree-like sway of the preferred embodiment is also a desirable, though not essential feature.

Figure 5:
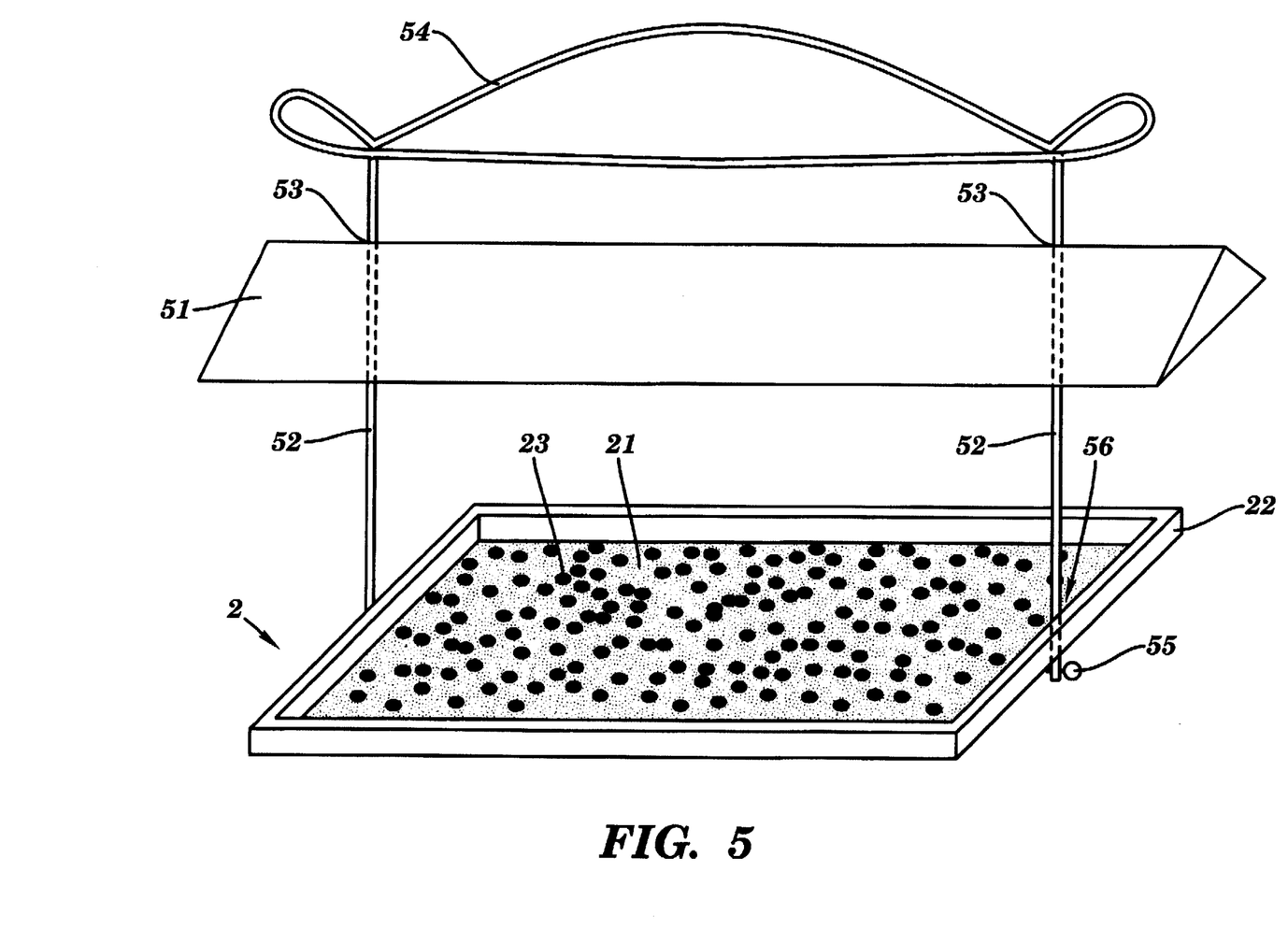
FIG. 5 depicts an optional adjustable roof mechanism which prevents access to the feeder by larger birds, if desired.

Another variation of this invention involves placing an optional feeder roof of adjustable height above the flatbed feeder, as depicted in FIG. 5. For this variation, a roof 51 is mounted on roof mounting rods 52, and held in place by a roof mounting eyelets 53. The eyelets 53 comprise holes through the roof with an affixed washer of rubberized or similar material that fits snugly around the rods 52, such that the roof may be held securely at any given height without falling due to the force of gravity or of birds or squirrels landing on the roof, but which allows enough play so that a person can move the roof up or down to a new height by applying appropriate upward or downward pressure. The mounting rods are themselves connected to a hanging rod 54, which may be used for hanging the feeder from above rather than placing it on the stand described in FIG. 4, if so desired. The roof 53 is attached above the feeder by inserting the mounting rods 52 through appropriately-sized holes in the feeding surface boundary 22 (as depicted by the broken line segment of the rod 52 on the right side of FIG. 5). A pin 55 inserted through the bottom of the rod 52 will hold up the flatbed feeder 2 in the event it is hung from above by the hanging rod 54. A stop 56, also inserted through the rod 52 just above the point where it goes through the feeding surface boundary 22, will hold up the roof 51 and rods 52 in the event the flatbed feeder 2 is supported from below (i.e., not hung from above). The pin 55 and stop 56 are depicted in the mounting rod 52 on the right side of FIG. 5. A similar pin and stop, not depicted, would also be placed in the left-side mounting rod.

When the roof 53 is removed or set to its maximum height, any and all bird types can easily gain access to the feeder and partake of the feed. When the roof is set to a lower position, however, larger birds, such as grackle, cowbird, and turtle dove, do not have enough room to perch atop the flatbed, because they are too large to squeeze under the roof. This is particularly so if the roof has endplates (such as the triangular component shown to the right of the roof as depicted) that prevent side access. Also, a flat, horizontal bottom panel (not shown) in the lower plane of the roof will further increase the difficulties for a larger bird attempting to reach the feed. This provides some degree of control, on the basis of size, over the types of birds that feed at the feeder.

Figure 6:
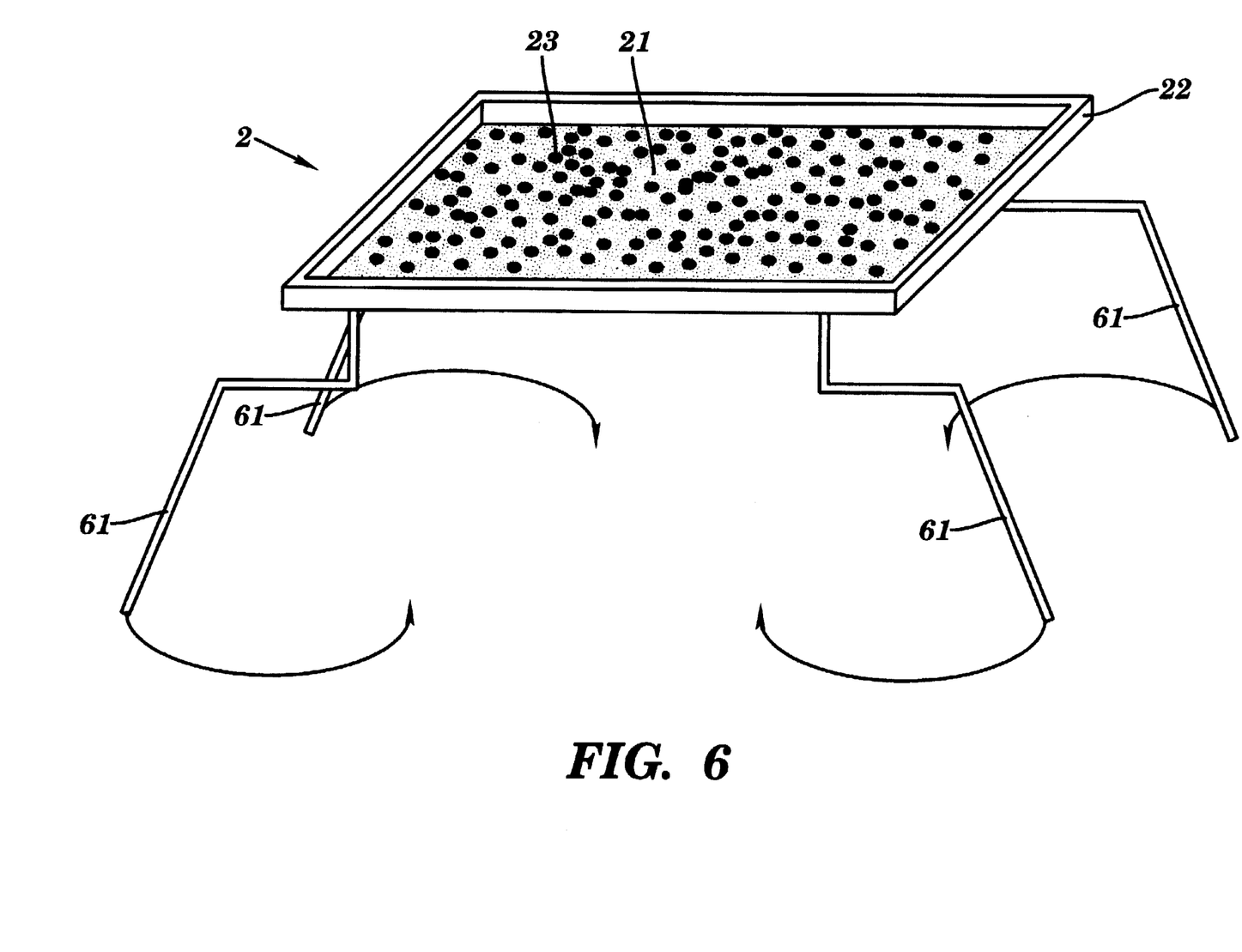
FIG. 6 depicts an optional rail mount configuration for the feeder stand.

FIG. 6 depicts an optional rail mount configuration for supporting the feeder stand. (The length of the feeder goes back into the page in FIG. 6, i.e., the dimension depicted here in front view is the width of the feeder.) A series of rail mount legs 61, as depicted, are inserted into the bottom of the flatbed feeder 2, into the same holes that were earlier used in connection with FIG. 4 to insert the arms 42. Thus, FIG. 6 depicts an alternative to the stand of FIG. 4. This stand is simpler to assemble, and may be used, for example, if one wishes to transport the bird feeder to a picnic site and set up easily and quickly. A particular feature of interest is that these legs 61 can be swiveled around 180° as shown by the semi-ovular directional arrows, to provide a means for securing the bird feeder, for example, on a deck rail, wherein the horizontal section of the legs 61, when in the swiveled position, will secure the birdfeeder by pushing and locking onto the underside of the deck rail.

Figure 7:
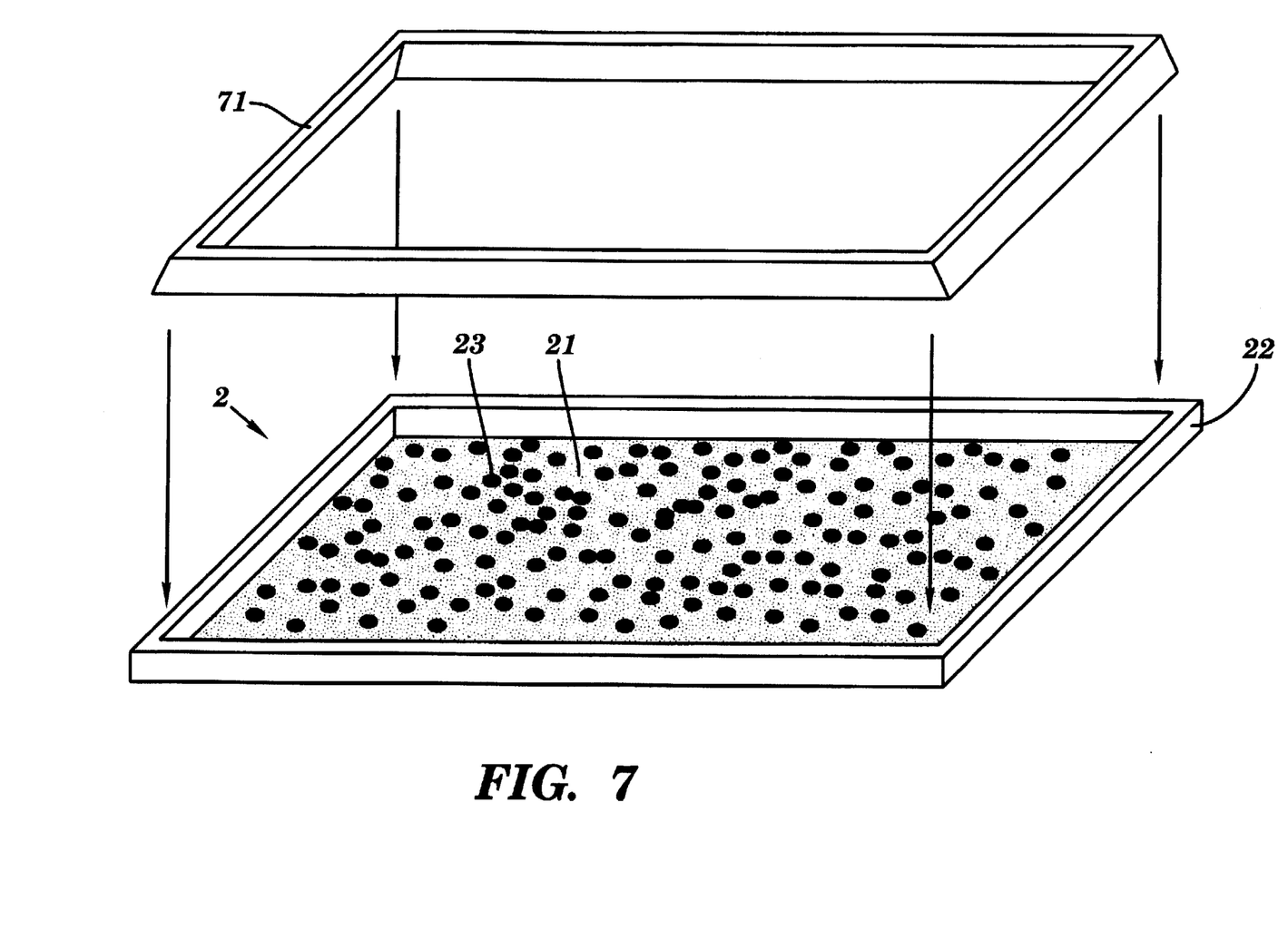
FIG. 7 depicts a slide mechanism which makes it more difficult to squirrels to gain a foothold at the flatbed feeder, and that, in combination with the adjustable roof, makes it more difficult for large birds to perch at the feeder.

FIG. 7 depicts an optional foothold-limiting slide 71, which may be rested or attached directly upon the feeding surface boundary 22. The lip (darkened) of the slide 71 is of the same dimension as the lip (also darkened) of the feeding surface boundary 22. Because of this, the squirrel barrier 1 can easily be inserted into the flatbed feeder 2 while the slide 71 is atop the feeder (see FIG. 2). The outer edges of the slide slant sharply downwards in a diagonal-direction, as depicted. The material used to fabricate the slide should be relatively slippery, i.e., should have low friction, so that it becomes difficult for a squirrel or bird to stand or hold onto the downward slanting part of the slide 71.

This slide makes it even more difficult for a squirrel beneath the flatbed (e.g., a squirrel perched on the sub-platform 41 of FIG. 4) to make an upward jump onto the top of the feeding platform 2 and the squirrel barrier 1. Additionally, in combination with the adjustable roof of FIG. 5, this slide makes it much more difficult for larger birds to partake of the feed, since they cannot fit under the roof to perch atop the squirrel barrier 1, and they cannot gain a foothold alongside the feeder either, since they will slide off of the slide.

Figure 8:
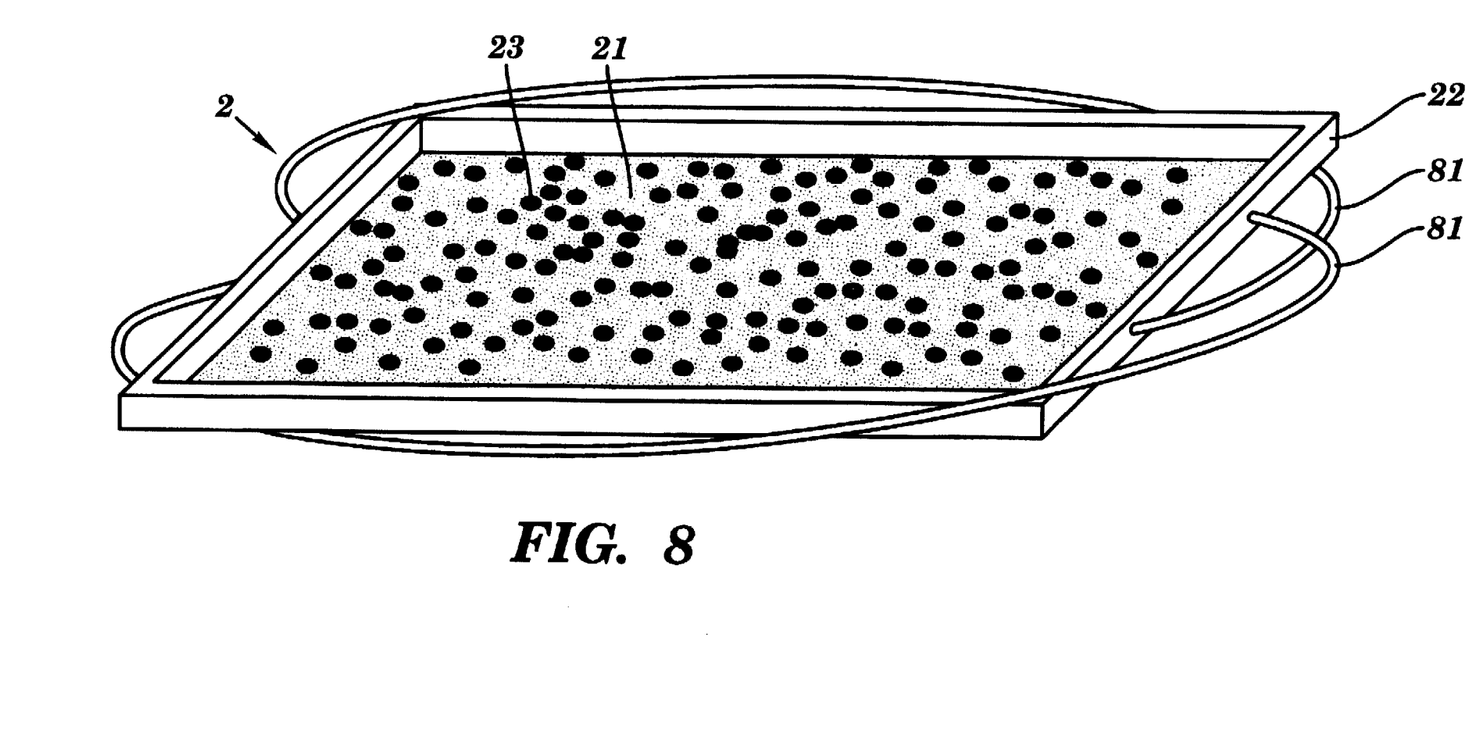
FIG. 8 depicts a series of removable perches to enhance access by the desired birds.

FIG. 8 depicts a series of removable perches 81 to enhance access by the desired birds. The curved perches 81 depicted here, which are for illustration of only one among many conceivable modes of design, utilize holes drilled into the sides of the feeding surface boundary 22. One end of a perch is placed into one of the holes on the side of the boundary 22. The perch is then looped over one corner, under the adjacent corner, and inserted in a hole on the opposite side of the feeder. This looping over and then under the corners stabilizes the perches against vertical movement. Of course, many other methods of designing a stable perch are equally feasible and are contemplated as obvious variations within the scope of this disclosure.

Finally, it is understood that this disclosure applies not only to the birdfeeding devices and systems outlined in this disclosure, but also to various methods of using the devices and systems outlined herein. For example, but not limited to these examples, if one were to use a squirrel barrier of the type disclosed herein atop an existing flatbed feeder, or were to place an existing flatbed feeder atop the various stands outlined herein, or to add to an existing flatbed feeder various other components and variations described herein, it is contemplated that this too would be covered by this disclosure.

I claim:

1. A squirrel-proof bird feeding device comprising:

a frame including a feed bed;

a first screen, positioned above said feed bed; and a second screen, positioned about 0.75 inches to 1.5 inches above said first screen, said second screen having apertures from about 0.75 to 1.5 inches.

2. The device of claim 1, wherein said feed bed further comprises a course screen with apertures from ⅛ inch to ⅜ inch.

3. The device of claim 2, wherein said feed bed further comprises a fine screen, positioned upon said course screen, said fine screen having apertures from ¹⁄₃₂ to ⅛ inch, whereby water may fall through said feed bed.

4. The device of claim 1, wherein the first screen includes apertures ranging from 0.25 to 0.75 inches.

5. The device of claim 4, wherein said first screen is made from 18 gauge wire.

6. The device of claim 1, wherein said second screen is chicken wire.

7. The device of claim 6, wherein said second screen is made from 20 gauge chicken wire.

8. A squirrel-proof bird feeder that prevents squirrels from accessing the feed intended for birds, said bird feeder comprising:

a frame including a feed bed for placing feed thereon; and a squirrel barrier positioned on said feed, said squirrel barrier including a first surface positioned adjacent said feed bed and a second surface positioned about 1.5 inches or less above said first surface, said second surface having openings of 1.5 inches or less for permitting a bird to place its head therethrough, whereby said squirrel barrier permits birds to gain access to the feed and prevents squirrels from gaining similar access due to the differences in facial characteristics between birds and squirrels.

9. The bird feeder of claim 8, wherein said feed bed includes a screen, whereby water may fall therethrough.

10. The bird feeder of claim 9, wherein said screen includes apertures from ⅛ to ⅜ inches.

11. The bird feeder of claim 9, wherein said screen includes apertures from ¹⁄₃₂ to ⅛ inches.

12. The bird feeder of claim 8, wherein said first and second surfaces of said squirrel barrier is wire screen.

13. The bird feeder of claim 12, wherein said first surface of said squirrel barrier has apertures from 0.25 to 0.75 inches.

14. The bird feeder of claim 13, wherein said first surface is made 18 gauge wire.

15. The bird feeder of claim 12, wherein said second surface of said squirrel barrier has apertures from 0.75 to 1.5 inches.

16. The bird feeder of claim 15, wherein said second surface is made from 20 gauge wire.

17. The bird feeder of claim 16, wherein said second surface is made from chicken wire.

18. The bird feeder of claim 12, wherein the material of said wire screen is selected from the group consisting of metal, plastic, nylon, and fishing wire.

19. The bird feeder of claim 12, wherein said first and second surface is a parallel series of elongated strips.

* * * * *